United States Patent [19]

Le Gal et al.

[11] Patent Number: 5,705,138

[45] Date of Patent: Jan. 6, 1998

[54] PROCESS FOR MANUFACTURING SYNTHETIC GAS AND ASSOCIATED UTILIZATION

[75] Inventors: Jean-Hervé Le Gal, Paris; Michel Maute, Les Clayes Sous Bois; Pierre Boucot, Ternay, all of France

[73] Assignee: Institut Francais du Petrole, Rueil Malmaison, France

[21] Appl. No.: 679,725

[22] Filed: Jul. 12, 1996

Related U.S. Application Data

[62] Division of Ser. No. 125,699, Sep. 24, 1993, Pat. No. 5,567,397.

[30] Foreign Application Priority Data

Sep. 25, 1992 [FR] France ............................ 92/11.568

[51] Int. Cl.$^6$ ...................................................... C10K 1/00
[52] U.S. Cl. ...................... 423/359; 252/373; 518/703; 564/63
[58] Field of Search ......................... 423/659, 359, 423/652; 252/373; 431/4, 7, 9, 10; 518/703; 564/63

[56] References Cited

U.S. PATENT DOCUMENTS 4,788,004  11/1988  Pinto et al. ............................ 252/373

*Primary Examiner*—Wayne Langel
*Attorney, Agent, or Firm*—Antonelli, Terry, Stout, & Kraus, LLP

[57] ABSTRACT

The invention relates to the manufacturing of synthetic gas according to which the following stages are performed within a single housing:

- partial combustion in a non catalytic combustion chamber,
- contacting of the combustion gases with a catalytic element,
- complementary injection of oxidizer in the catalytic bed.

According to the invention, maximum direct contact is provided between the combustion gases and a surface of the catalytic bed so as to reduce the formation of soots.

7 Claims, 2 Drawing Sheets

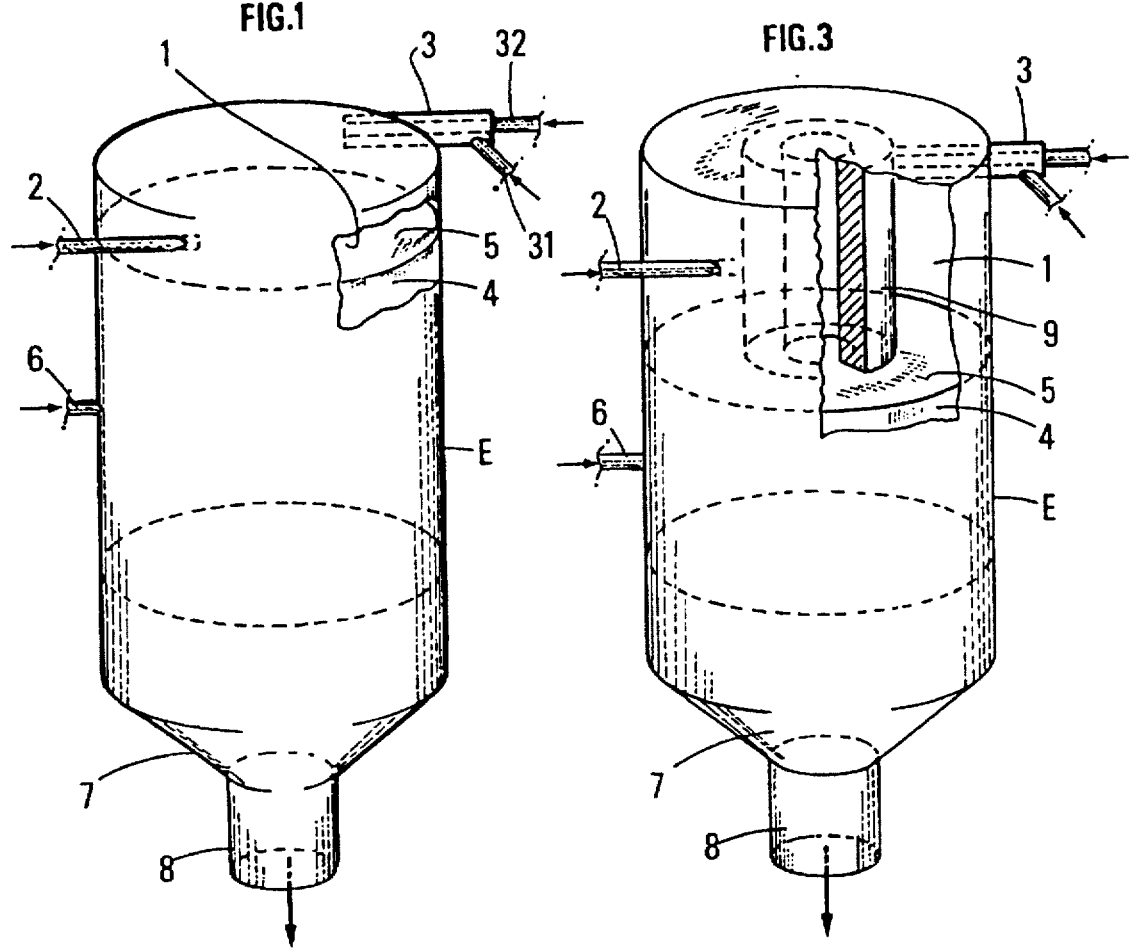
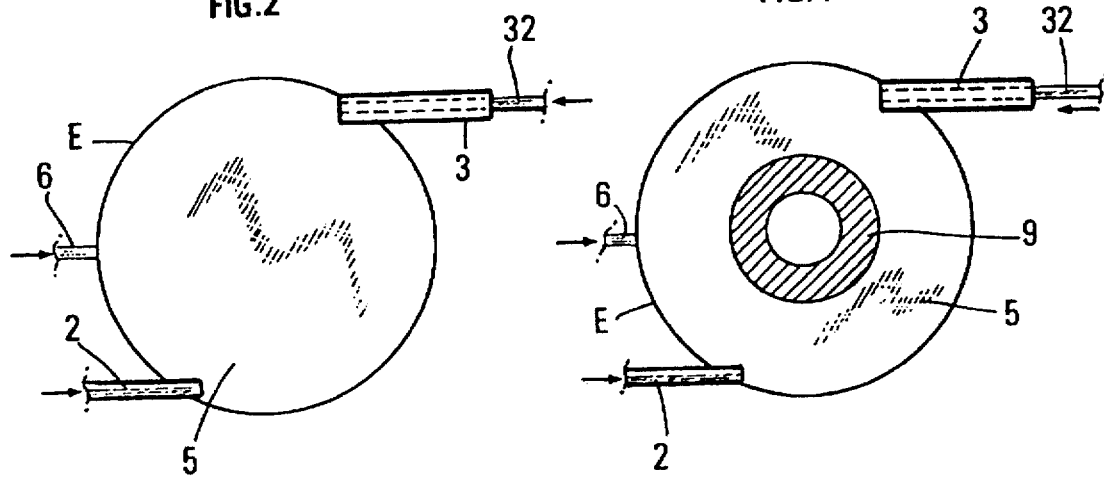

PROCESS FOR MANUFACTURING SYNTHETIC GAS AND ASSOCIATED UTILIZATION

This application is a Divisional application of application Ser. No. 125,699, filed Sep. 24, 1993, U.S. Pat. No. 5,567,397.

FIELD OF THE INVENTION

The present invention relates to the manufacturing of synthetic gas through the reaction of a fuel with at least one oxidant.

More precisely, the invention aims at the manufacturing of synthetic gas comprising a combustion called a multistage combustion, i.e. according to which a partial combustion, under lack of oxidant, is achieved in a first reactor or in a first zone: primary reforming stage. The effluents resulting from this combustion may be run towards a catalytic bed at the level of which a complementary supply of oxidizer is preferably provided: secondary reforming stage.

BACKGROUND OF THE INVENTION

The concept of the multistage combustion is for example disclosed in patent U.S. Pat. No. 3,278,452 which describes a primary reforming reactor including a catalyst associated with a secondary reforming reactor, the latter receiving an additional supply of oxidant between catalytic beds arranged successively in the second reactor.

The main drawback of this type of reactors is that it requires a large amount of steam injected at the level of the oxidizer and/or of the fuel and whose production is often costly.

Furthermore, the drawback of steam excess is to modify the distribution between the hydrogen, the carbon dioxide and the carbon monoxide present in the synthetic gas.

French patent application EN.91/09,214 relates to the manufacturing of a synthetic gas of the type described above, according to which all of the operations are performed within a single housing; besides, in order notably to reduce steam consumption, the non catalytic combustion chamber is a short residence time chamber.

This realization requires a lower steam consumption.

SUMMARY OF THE INVENTION

The present invention relates to the same type of reactor for manufacturing synthetic gas and it also aims at reducing the formation of soots and/or of soot forerunners, hence improved running and maintenance. Besides, such a reactor allows further scrubbing of the effluents to be avoided.

In fact, tests have advantageously shown that, for certain chamber and burner geometries, the combustion produces less soots if the combustion gases come into contact with a catalytic element located inside said chamber. This behaviour is notably due to the combination of two factors:

the lowering of the temperature of the chamber by the catalytic element which generates endothermic reactions, the catalytic effect proper on the radical species initiating aromatic compounds leading to the formation of soots.

In order to reach the objectives stated above, the object of the invention is to provide a device for manufacturing synthetic gas, comprising within a single housing E:

a non catalytic combustion chamber comprising at least one fuel injection element and at least one oxidizer injection element so as to achieve a partial combustion in said chamber, a catalytic element brought into contact with at least part of the gases coming -from the combustion chamber, and at least one element for injecting complementary oxidizer and opening at the level of said catalytic element.

According to the invention, the surface of contact between said chamber and the catalytic element is such that:

$$\frac{V}{S} < \frac{d}{4}$$

where
V is the overall volume of the chamber, expressed in $m^3$,
S is the surface of the chamber in contact with the catalytic element, expressed in $m^2$,
d is the greatest dimension of the chamber, expressed in meters, so that said surface is as large as possible, which allows the formation of soots in said chamber to be reduced.

Advantageously, at least one of the fuel and/or oxidizer injection elements is so arranged that the jets are not oriented directly towards said catalytic element, in order not to damage it.

Preferably, the fuel and oxidizer injection elements open into the combustion chamber at a certain distance from one another.

Preferably, the inner wall of the combustion chamber is coated with a layer consisting of a catalytic element.

Besides, the oxidizer injection element may allow fuel to be injected.

According to one embodiment, housing E is substantially cylindrical and said fuel and oxidizer injection elements open into the combustion chamber tangentially to the inner wall, the combustion chamber and the catalytic bed being each substantially cylindrical.

According to another embodiment of the invention, the catalytic bed is topped by an element consisting of a catalytic matter, located in the combustion chamber and intended for increasing said surface of contact S.

The invention further relates to a process for manufacturing synthetic gas implementing the device defined above and consisting in:

achieving a partial combustion in a non catalytic combustion chamber by injection of at least one fuel and at least one oxidizer, contacting the gases resulting from the combustion with a catalytic element and passing them therein, injecting complementary oxidizer at the level of the catalytic bed so as to complete said combustion, discharging the synthetic gases which have flowed past the catalytic bed.

In a characteristic way, the process further consists in achieving a maximum contact between the combustion gases and said catalytic element so as to reduce the formation of soots in said combustion chamber.

Preferably, the injection of fuel and of oxidizer into said chamber is such that the jets are not oriented directly towards said catalytic bed.

According to a particular embodiment of the invention, the injection of fuel occurs in said combustion chamber at a certain distance from the injection of oxidizer.

Advantageously, an additional injection of fuel is achieved in the combustion chamber, substantially in the same place as the injection of oxidizer.

More advantageously, the invention is used for manufacturing ammonia, urea, methanol or higher hydrocarbons.

BRIEF DESCRIPTION OF THE DRAWINGS

Other features and advantages of the invention will be clear from reading the description hereafter, given by way of non limitative examples, with reference to the accompanying drawings in which:

FIG. 1 is a perspective view of an embodiment of the invention,

FIG. 2 is a topview of the device according to FIG. 1,

FIG. 3 is a perspective view of another embodiment of the invention,

FIG. 4 is a topview of the device according to FIG. 3,

DESCRIPTION OF THE PREFERRED EMBODIMENTS

Figure 5:
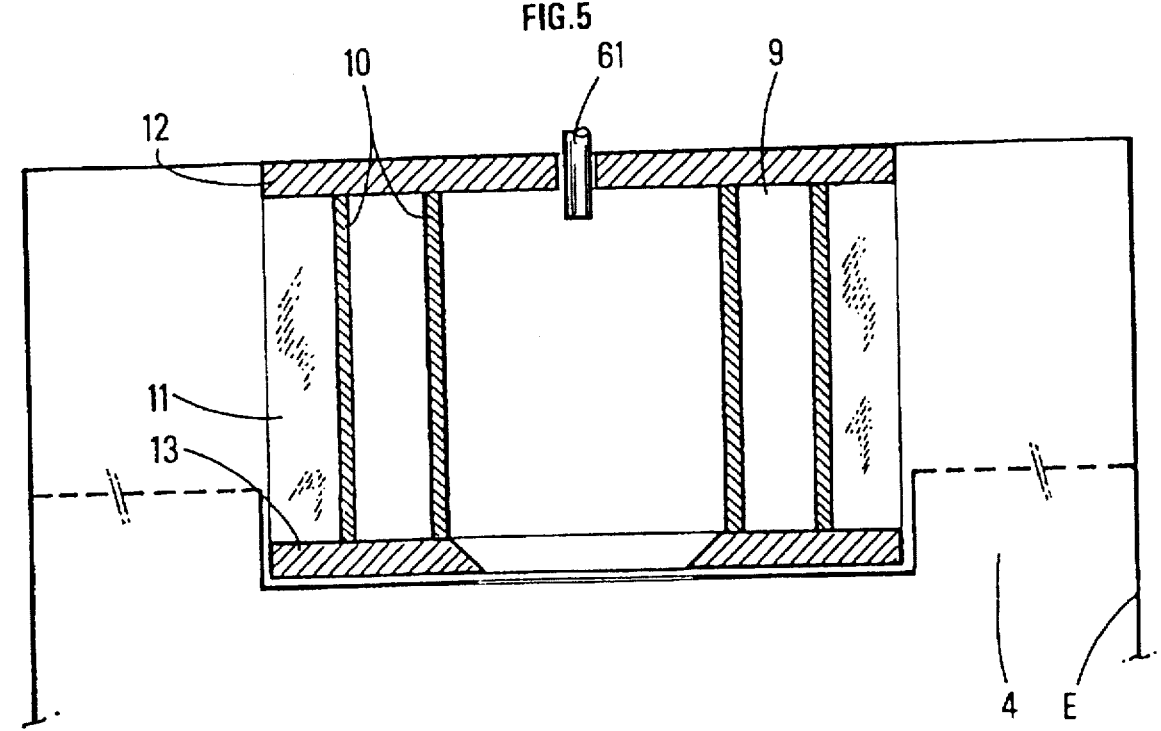
FIG. 5 is a longitudinal section showing a detail of FIG. 3.

FIG. 1 shows a reactor according to the invention.

As it is known in the art, the reactor comprises, within a single housing E, a combustion chamber 1 into which open at least one fuel injection element 2 and at least one oxidizer (or oxidant) injection element 3.

The closed volume or combustion chamber 1 has here a common surface 5 with a catalytic bed 4. What is understood to be a "catalytic bed" 4 is a zone made up of at least one volume comprising catalytic matter.

When several volumes form the "catalytic bed", one or several complementary oxidizer inlets 6 opening into the spaces empty of catalytic matter, i.e. between the various catalytic volumes, are provided.

Downstream from catalytic bed 4, with respect to the direction of flow of the gases in the reactor, a zone 7 allows the gases resulting from the reaction to be collected, and an outlet manifold 8 may be provided to discharge the gases.

More precisely, the preferred working conditions are the following: the catalytic matter used consists of:

an oxide-based support with refractory properties, whose acidity has been neutralized, an active phase comprising 2 to 40%, preferably 3 to 30% by mass of at least one reducible metal M selected from nickel, cobalt, chromium, the metals of the platinum group. Taken separately, the proportion of metals of the platinum group ranges between 0.01 and 1% by mass of the total above.

The oxide-based support comprises at least one simple or mixed oxide from the following list: alpha alumina; aluminate of spinel structure $NAl_2O_4$–$xAl-2O_3$ with x=0,1,2; at least one metal N selected from the list: magnesium, calcium, strontium, baryum, potassium; aluminate of magnetoplumbite structure (or hexaaluminate) $NAl_{12}O_{19}$; N being a metal from the list above.

These supports may also be possibly promoted by at least one metal P selected from silicon, potassium, uranium.

Under the most severe thermal conditions, for example with average temperatures higher than 1000° C., preferably higher than 1100° C. and more preferably higher than 1200° C., it may be advantageous to arrange at the top an attack layer consisting for example of chromium oxide or of a small proportion of nickel deposited on one of the supports cited above. This catalyst will protect the other catalyst located in the lower layer as described hereafter.

The catalysts used in the process according to the invention are prepared either by impregnation of the preformed support by a solution containing at least one metal M and possibly at least one metal P, drying and thermal activation, or by mixing of the precursors oxides of metals aluminum, M and N, possibly P, forming, drying and activation. Metal P, if there is any, may be added either before or after forming.

Finally, it is also possible to prepare them by coprecipitation or by the sol-gel process.

The catalysts used in the process according to the invention may exhibit the most varied geometries: pellets, balls, extrudates, annular pellets, ribbed rings, wheel-shaped catalysts from 3 to 30 mm. They may even be used in the form of monoliths, consisting either of the oxides and/or the metals corresponding to the metallic elements cited above, or of refractory steel monoliths coated with said elements. One or several monoliths may be present.

Preferably, the catalysts promoted by potassium or strontium, or potassium plus calcium, or calcium will be used when the risk of carbon deposition is the highest.

The fuel injected through element 2 may preferably be a mixture of methane or natural gas and of steam, or another mixture of hydrocarbons and of carbon oxides ($CO$, $CO_2$) or a mixture of methane and nitrogen, or other inert gases.

The oxidizer introduced through element 3 may be pure oxygen or a mixture of nitrogen, oxygen, carbon oxide, . . .

Steam is preferably introduced simultaneously into the oxidizer and/or the fuel in a molar ratio proportion such that:

$$\frac{\Sigma(H_2O + COx)}{\Sigma C} < 1.5$$

x=1,2 for example $\Sigma$ ($H_2O$+$COx$) being the total amount of water and of carbon oxides ($CO$ or $CO_2$) introduced in the reactor $\Sigma$ C being the sum of all the carbon introduced in the reactor.

The various constituents (fuel, oxidizer and steam) are preferably preheated outside the reactor.

The pressure in housing E ranges for example between $10^5$ and $10^7$ Pa.

According to the invention, the combustion chamber 1 has a surface of direct contact 5 as large as possible with a catalytic element. The catalytic element notably comprises catalytic bed 4.

In other words, it is advisable to design a combustion chamber 1 whose ratio of volume V to the surface S in direct contact with the catalytic element is as small as possible. This may be expressed by the following relation:

$$\frac{V}{S} < \frac{d}{4}$$

where d is the greatest dimension of the combustion chamber. The units used are such SI units that the inequation is homogeneous.

It must be pointed out that the catalytic element 4, apart from its chemical purpose with regard to the soot forerunners, achieves a thermal well downstream from combustion chamber 1, which decreases the temperature therein and therefore the formation of soots.

The temperature in the combustion chamber may be about 1150° C. while the temperature of the oxidant at the inlet of combustion chamber 1 may be about 550° C. and the temperature of the fuel ranges around 550° C.

Another feature of the invention is that the elements 2 and 3 intended for injecting respectively the fuel and the oxidizer into combustion chamber 1 are arranged in such a way that the jets they generate are not directly oriented towards catalytic bed 4.

In fact, the volume of combustion chamber 1 being rather small, the jets might damage catalytic bed 4 if they were directed towards it.

Thus, with the embodiments of FIGS. 1 to 4, jets substantially tangential to the inner wall of the combustion chamber are provided.

Moreover, tests have shown that a distance between injectors 2 and 3 allows the formation of soots in combustion chamber 1 to be reduced very substantially.

A lay-out according to which injectors 2 and 3 are diametrically opposite has thus been preferred in the embodiments in accordance with FIGS. 1 to 4.

Another way of reducing soots in the combustion chamber may consist in coating the inner face of the combustion chamber with a layer made of a catalytic matter such as defined previously and more particularly of a catalyst withstanding high temperatures. The catalytic element comprises, in this case, the catalytic bed 4 and said catalytic layer.

Preferably, the surface in contact with the combustion gases may consist of a material withstanding high gas velocities such as refractory cellular plates or elements. In some cases, this highly resistant surface may be inserted between chamber 1 and another, softer catalytic material. However, tests have shown that the soot concentrations are markedly reduced when the surface made from resistant material is catalytic itself.

The catalytic layer may for example be obtained through a technique of projection of a refractory concrete into which a catalytic element has been mixed.

It is commonly 20 mm thick.

In order to allow the process according to the invention to be started, the injection of oxidizer at the level of the injector 3 opening into combustion chamber 1 may be coupled with the injection of fuel: methane and possibly steam, or carbon oxides and steam.

This combustible mixture may be fed, through an additional line 31, to the oxidizer supply line 32. The two lines 31, 32 may be coaxial and open substantially in the same place in combustion chamber 1.

According to the embodiment of the invention shown in FIGS. 1 to 4, the combustion chamber is substantially cylindrical and answers the inequation expressed above.

The V/S ratio for this geometry is therefore substantially equal to h, the height of the chamber.

The V/S ratio is considered to be "small" when it is less than a quarter of the greatest dimension of the chamber, that is, in this case: h<d/4, hence the inequation cited above:

$$\frac{V}{S} < \frac{d}{4}$$

FIGS. 3 and 4 show an embodiment which only differs from that of FIGS. 1 and 2 in the presence of a catalytic structure 9 located above the catalytic bed 4 defined above. This additional structure 9 may be a porous catalytic structure or a full cylinder with catalytic walls. It allows the surface of contact S between the combustion chamber and the catalytic element to be increased. The inequation expressed above remains satisfied since S increases, and the V/S ratio decreases.

An example of a connection between structure 9 and catalytic bed 4 is shown in FIG. 5.

Several embodiments of this connection may be envisaged, but, in any case, this lay-out must provide a good heat transfer between the two parts (9 and 4) and easy passage of the gas towards the central part of structure 9. The same pressure drops must exist, whether the gas passes directly into catalytic bed 4 via the annular space around structure 9, or flows past structure 9, then the catalytic bed.

Figure 6:
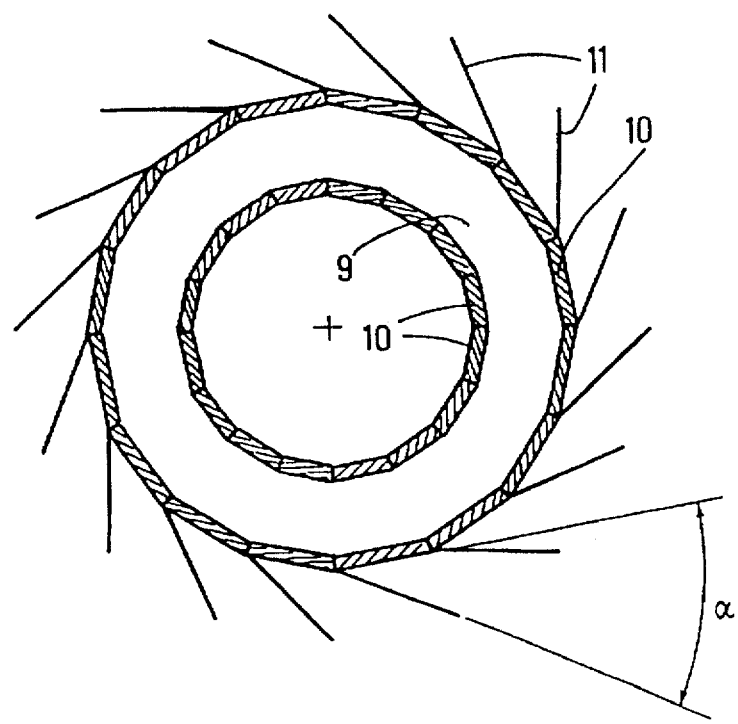
FIG. 6 is a cross-section of an example of the embodiment of an additional catalytic structure.

Furthermore, without departing from the scope of the present invention, refractory elements withstanding high temperatures may support and/or protect the porous structure 9. FIG. 6 shows for example a (catalytic, porous and annular) structure 9 delimited radially by two arrays of cylinders consisting of cellular ceramic plates 10. Thermal shields 11 may also be provided to protect such an array from the impact of the jets. Shields 11 may consist of plates having one side tangent to the ceramic plates 10 and forming a constant angle α with ceramic plates 10.

Two end plates 12, 13 made from a refractory material delimit respectively the upper part and the bottom of structure 9.

Finally, a complementary oxidizer inlet 61 may be provided in combination with injectors 2 and 3: inlet 61 opens longitudinally into structure 9.

This complementary oxidizer injection 61 may substitute for or add to the inlets 6 defined above.

Various tests have been carried out:

TEST 1:

With a reactor such as that illustrated in FIGS. 1 and 2, under the following conditions:

fuel composition: natural gas comprising about 97.5% by volume of methane and about 2.1% by volume of $C_2H_6$;

an overall flow rate of about 6 g/s at the various intakes, a $O_2/C$ ratio of about 0.54 and a $H_2O/C$ ratio close to 0.75, a temperature of about 800° K at the various intakes, a temperature slightly higher than 1300° K is measured at the outlet of chamber 1, scarcely 30 mg/Nm$^3$ second of soots are obtained in the combustion chamber.

TEST 2:

With the same reactor as that shown in FIGS. 1 and 2, but without catalyst 4 (therefore according to the prior art):

the composition of the natural gas, the overall flow rate and the tension at the various intakes are substantially the same as for test 1, the $O_2/C$ ratio is about 0.38 and the $H_2O/C$ ratio is about 0.89, the temperature at the outlet of combustion chamber 1 is a little higher than 1400° K, 235 mg/Nm$^3$ second of soots are obtained in chamber 1.

The comparison between these two tests shows the effect of catalyst 4 on the formation of soots in the chamber. At the same time, a substantial temperature drop is noticed at the outlet of chamber 1, in accordance with what had been announced at the beginning of the description.

TEST 3:

This test has been carried out with a reactor comprising a catalyst 4, the surface of contact 5 being coated with an alumina layer.

The operating conditions are substantially the same as in test 2.

A temperature of about 1400° K has been measured at the outlet of chamber 1, a little more than 40 mg/Nm$^3$ second of soots have been obtained in combustion chamber 1.

This test shows the intrinsic effect of the catalyst since the alumina layer has actually inhibited the action of the catalytic surface: this may be seen through the temperature at the outlet of chamber 1 (1400K), which is the same as the temperature obtained in test 2 without a catalyst. Besides, a soot ratio markedly higher than that obtained in test 1 with a catalyst is obtained.

The present application may be provided with other additions and/or modifications by the man skilled in the art without departing from the scope of the present invention.

We claim:

1. A process for manufacturing synthetic gas, within a single housing, which comprises effecting partial combustion in a non catalytic combustion chamber of at least one fuel and at least one oxidizer by injecting said at least one fuel and said at least one oxidizer into said non catalytic combustion chamber; contacting combustion gases within the non catalytic combustion chamber with a catalytic element comprising at least one catalytic bed, a surface of the catalytic bed defining a boundary of the non catalytic combustion chamber, and passing the combustion gases through the catalytic bed, wherein the non catalytic combustion chamber and the surface of the catalytic bed are disposed such that $$\frac{V}{S} < \frac{d}{4},$$

where V is the overall volume of the non catalytic combustion chamber, expressed in cubic meters, S is the surface of the non catalytic combustion chamber in contact with the catalytic element, expressed in square meters, and d is the greatest dimension of the chamber, expressed in meters;

injecting complementary oxidizer into the catalytic bed so as to effect complete combustion of said fuel; and discharging synthetic gases from the catalytic bed; whereby the relationship $$\frac{V}{S} < \frac{d}{4}$$

provides a maximum contact surface between the combustion gases and said catalytic element prior to the combustion gases and said catalytic element prior to the combustion gases entering into the catalytic bed so as to reduce the formation of soot in the combustion chamber.

2. The process as claimed in claim 1, wherein the fuel and oxidizer are injected into the combustion chamber in such a manner that jets of the fuel and oxidizer are not oriented directly towards the catalytic element.

3. A process as defined in claim 1, wherein the fuel is injected into the combustion chamber at a certain distance away from a point of injection of the oxidizer into said combustion chamber.

4. A process as claimed in claim 1, wherein additional injection of fuel into the combustion chamber is effected at the same location as the injection of oxidizer.

5. A process as claimed in claim 1, further comprising using the synthetic gases obtained from the single housing for manufacturing ammonia, urea, methanol or higher hydrocarbons.

6. A process as claimed in claim 3, wherein said single housing is substantially cylindrical and wherein the fuel and oxidizer are injected into the non catalytic combustion chamber tangentially to an inner wall of said single housing.

7. A process as claimed in claim 6, wherein said fuel and said oxidizer are injected at diametrically opposite locations within said non catalytic combustion chamber.

* * * * *